(No Model.) 6 Sheets—Sheet 1.

W. C. STEWART.
MACHINE FOR MOLDING HEEL STIFFENERS.

No. 467,473. Patented Jan. 19, 1892.

WITNESSES.

INVENTOR.

(No Model.) 6 Sheets—Sheet 2.
W. C. STEWART.
MACHINE FOR MOLDING HEEL STIFFENERS.
No. 467,473. Patented Jan. 19, 1892.
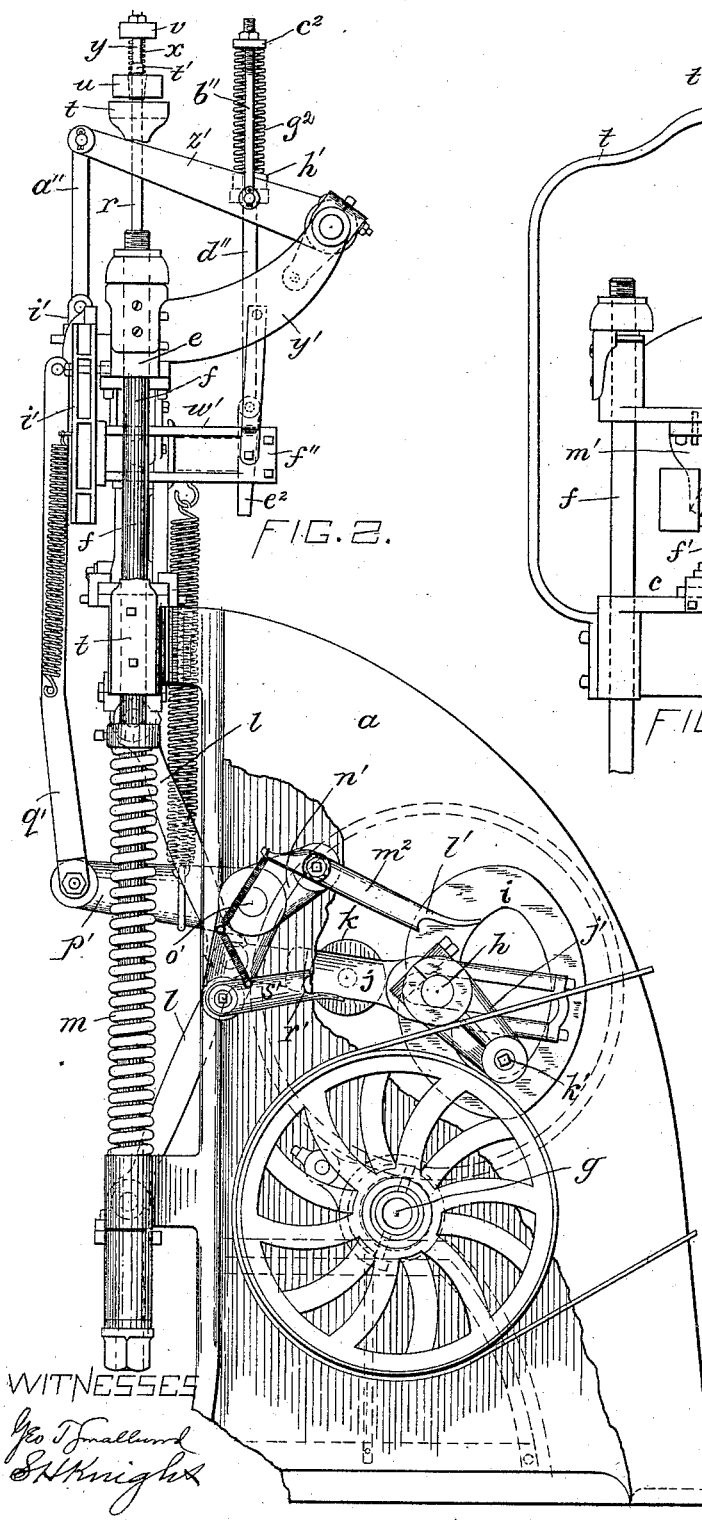
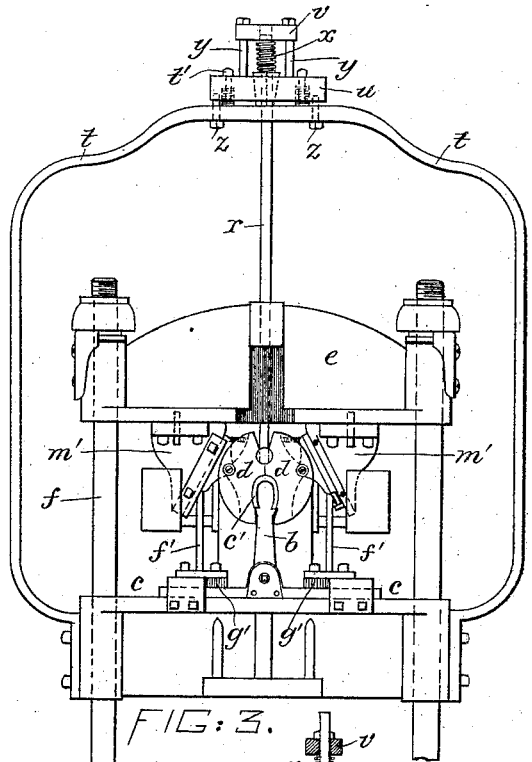
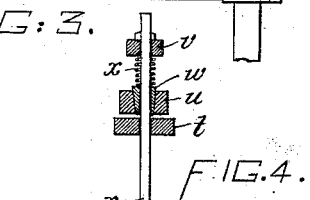
WITNESSES
INVENTOR:
W. C. Stewart (No Model.) 6 Sheets—Sheet 3.
W. C. STEWART.
MACHINE FOR MOLDING HEEL STIFFENERS.
No. 467,473. Patented Jan. 19, 1892.
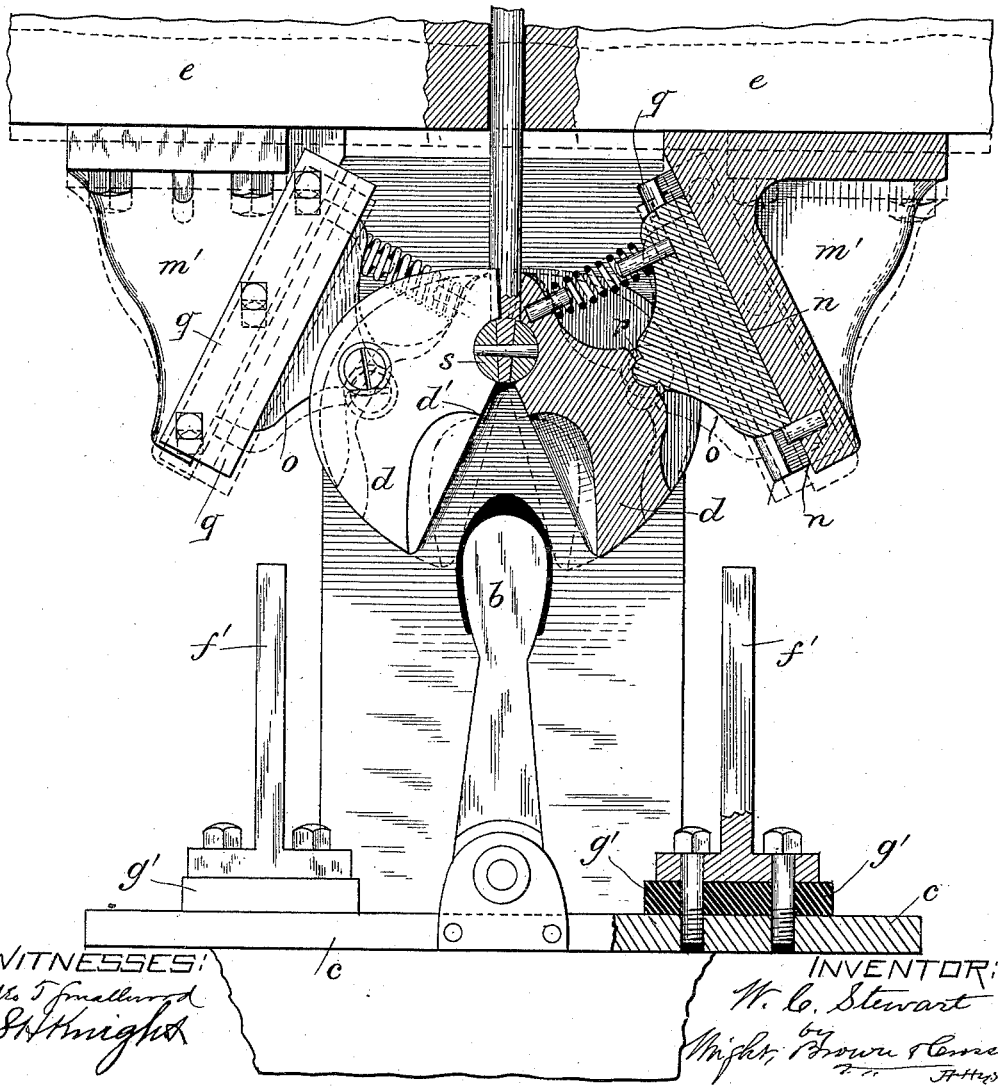

(No Model.) 6 Sheets—Sheet 4.
W. C. STEWART.
MACHINE FOR MOLDING HEEL STIFFENERS.
No. 467,473. Patented Jan. 19, 1892.
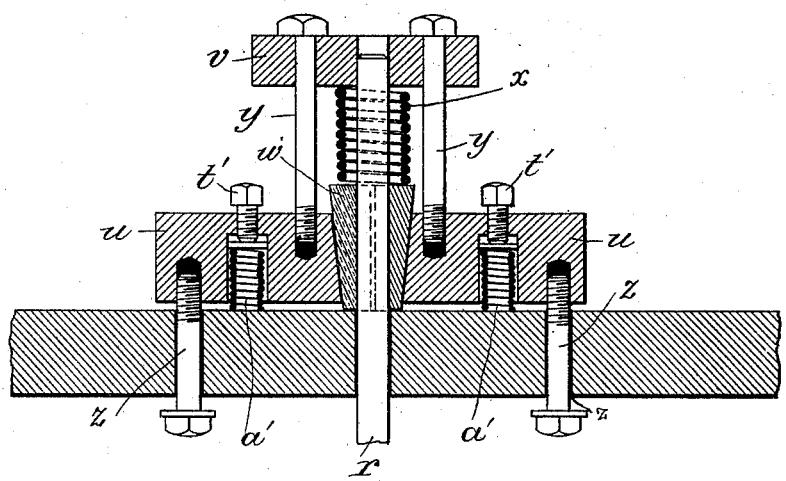
Fig. 6.
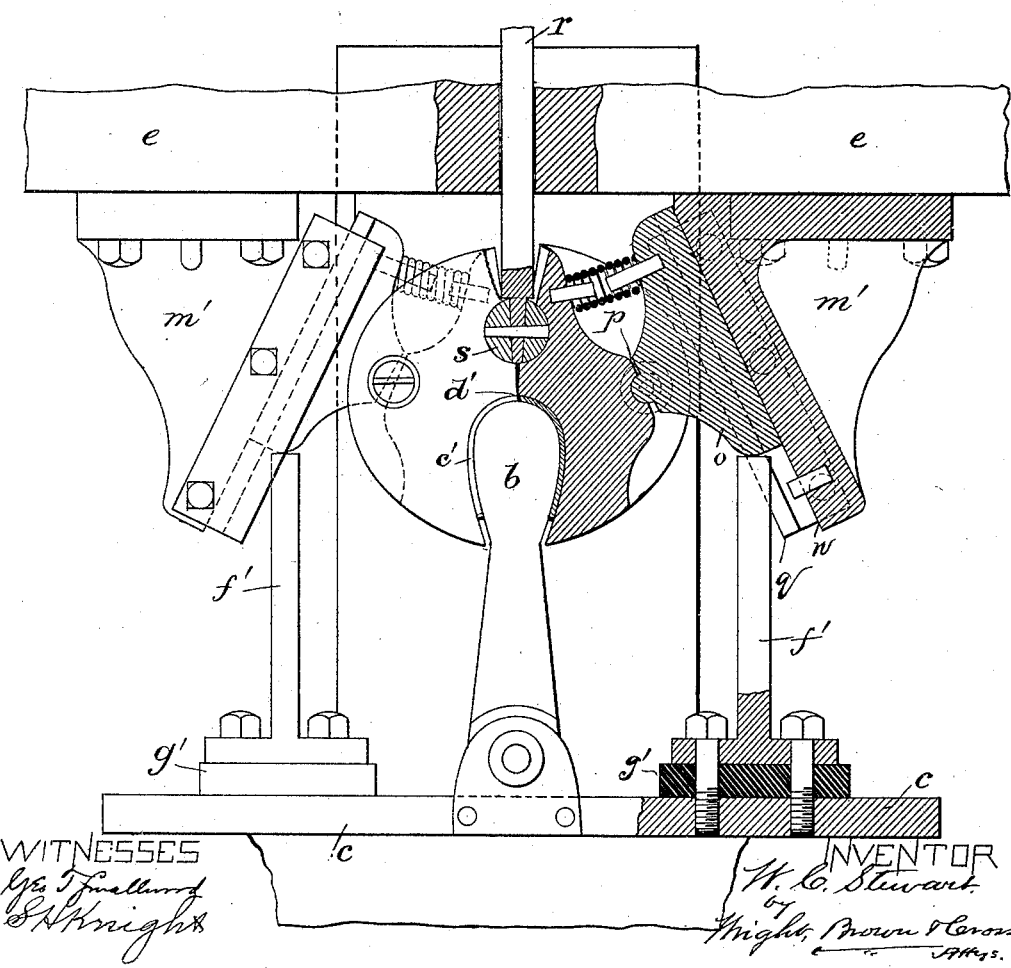

(No Model.) 6 Sheets—Sheet 5.
W. C. STEWART.
MACHINE FOR MOLDING HEEL STIFFENERS.
No. 467,473. Patented Jan. 19, 1892.
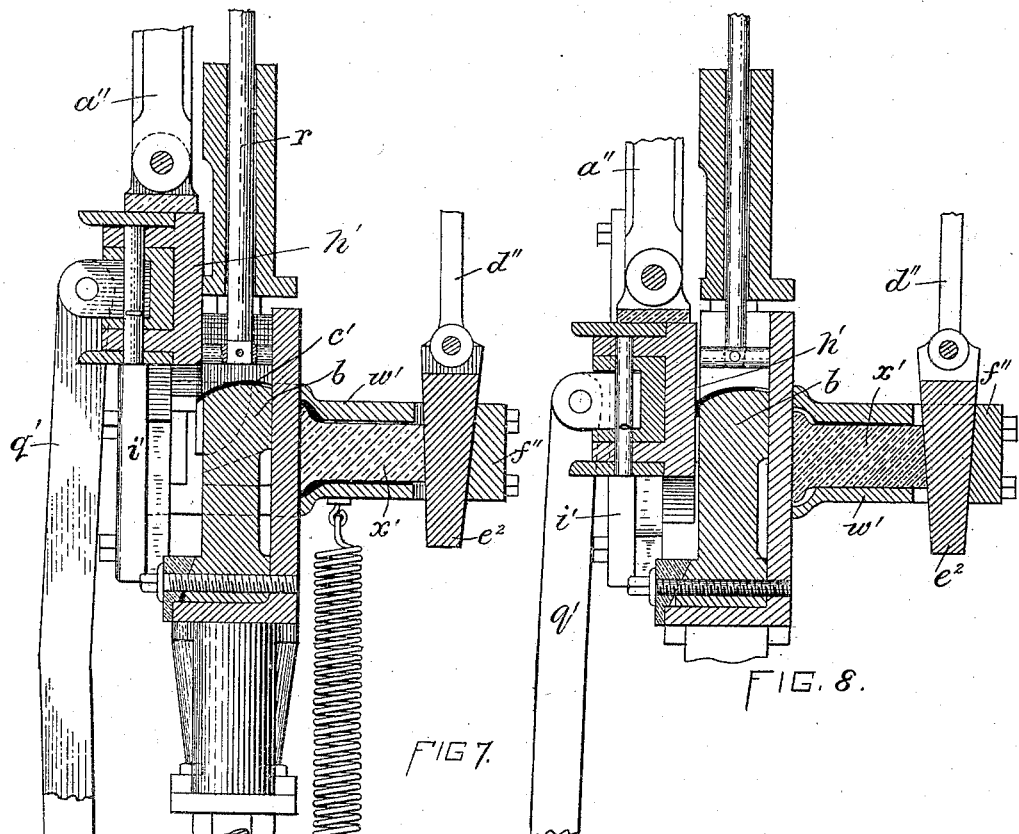
FIG. 7. FIG. 8.
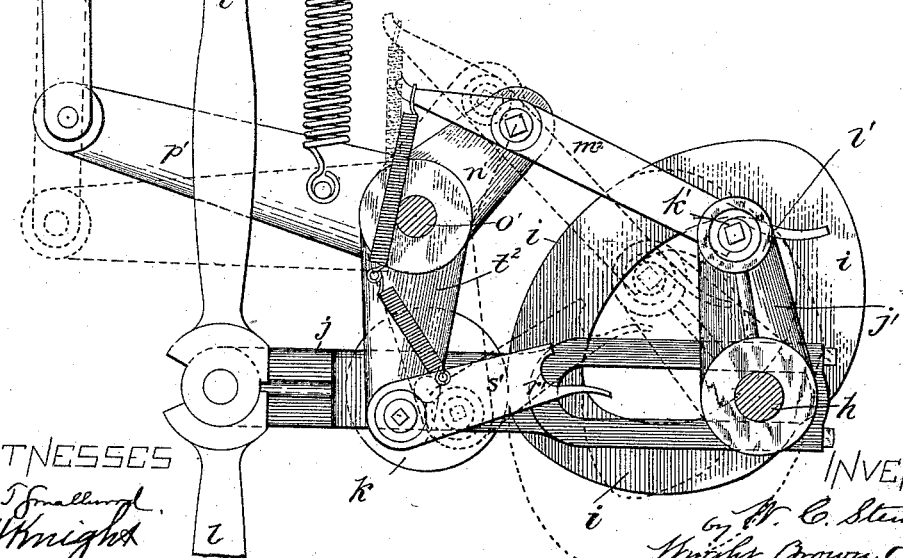
WITNESSES
INVENTOR (No Model.) 6 Sheets—Sheet 6.

W. C. STEWART.
MACHINE FOR MOLDING HEEL STIFFENERS.

No. 467,473. Patented Jan. 19, 1892.

WITNESSES:

INVENTOR:
W. C. Stewart,
by Wright, Brown & Crossley
attys

UNITED STATES PATENT OFFICE.

WILLIAM C. STEWART, OF LYNN, MASSACHUSETTS, ASSIGNOR OF ONE-HALF TO ALEXANDER STEWART, JR., OF SAME PLACE.

MACHINE FOR MOLDING HEEL-STIFFENERS.

SPECIFICATION forming part of Letters Patent No. 467,473, dated January 19, 1892.

Application filed January 24, 1891. Serial No. 378,941. (No model.)

*To all whom it may concern:*

Be it known that I, WILLIAM C. STEWART, of Lynn, in the county of Essex and State of Massachusetts, have invented certain new and useful Improvements in Machines for Molding Counters or Stiffeners, of which the following is a specification.

My invention has relation to counter or stiffener molding machines—that is, machines designed to shape blanks of leather, leatherboard, or sheet-pulp, &c., to proper form for use as counters or stiffeners in the manufacture of boots or shoes.

It is the object of my invention to provide such improvements in machines of the class mentioned as will enable counters or stiffeners to be molded without causing a rib or mark along the rear of the heel, even though the stock operated upon should vary in thickness.

It is also the object of the invention to provide such improvements in counter-molding machines as will secure a perfect shaping of the stiffener and enable the work to be done expeditiously, economically, and in an entirely perfect manner.

The invention will first be described in connection with the accompanying drawings, forming part of this specification, and then be pointed out in the appended claims.

Figure 1:
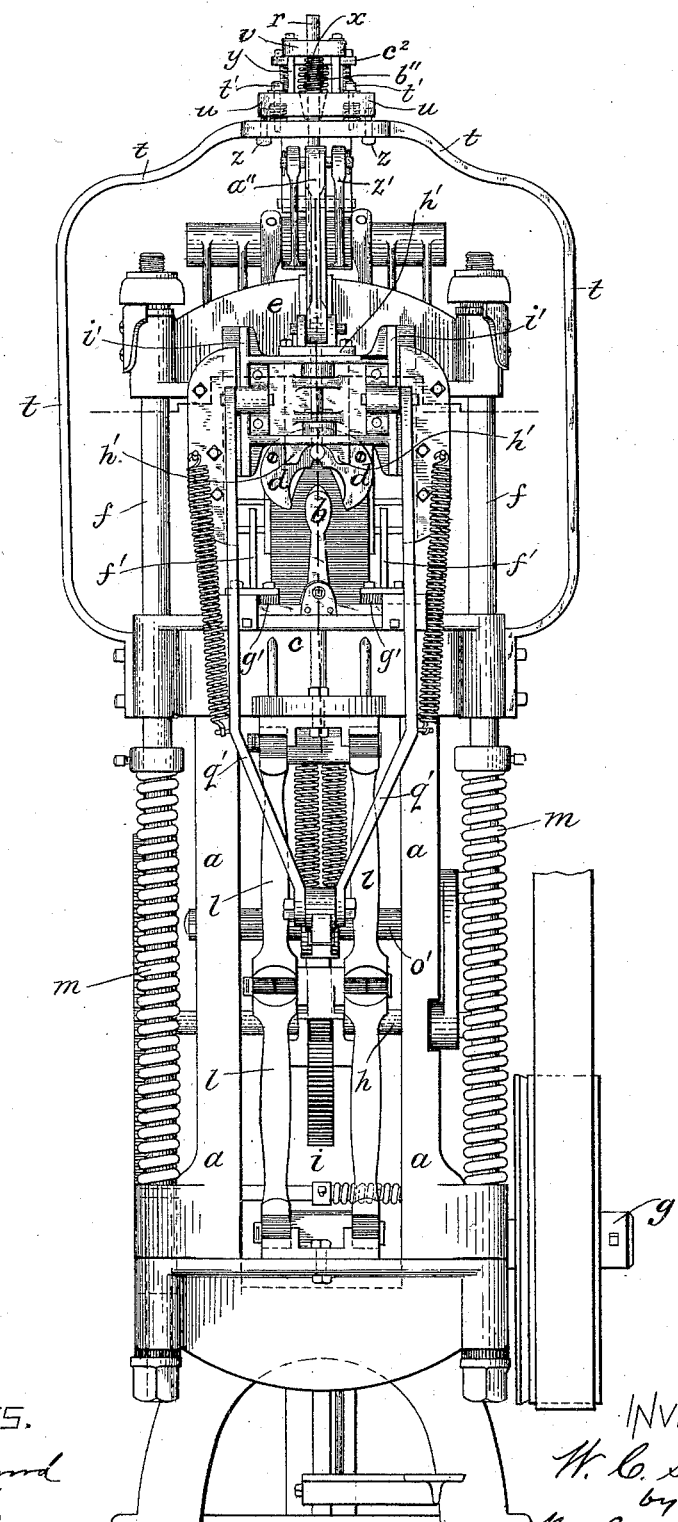
Figure 9:
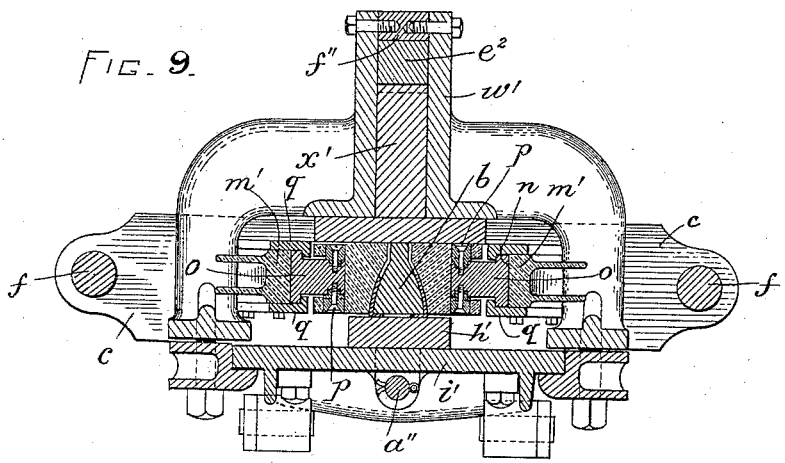
Figure 10:
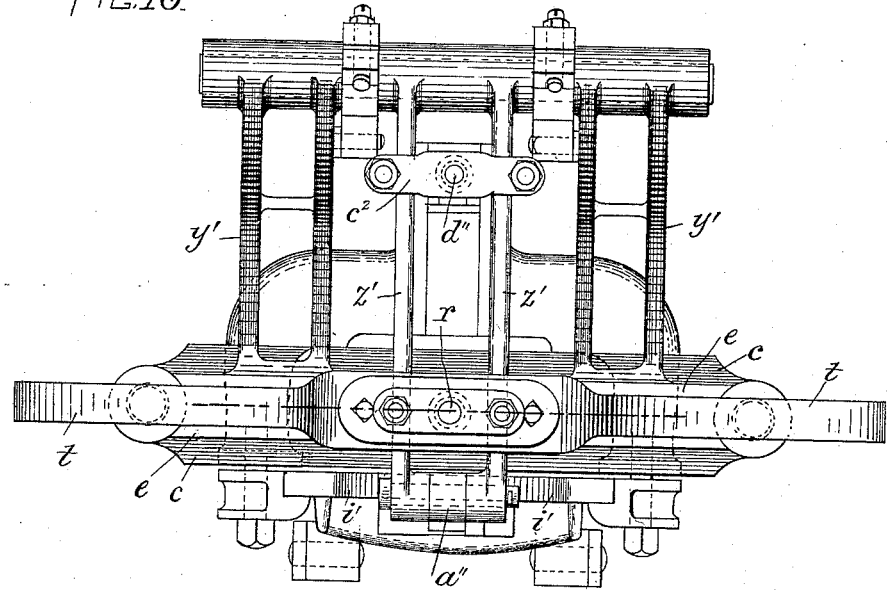

In the drawings, Figure 1 is a front view of the machine complete. Fig. 2 is a side view of the same. Fig. 3 is a front view of the upper portion of the improved machine, the flange-setting device being removed therefrom. Fig. 4 is a vertical central sectional view of the part shown in Fig. 3. Fig. 5 is a detail front view on an enlarged scale, partially in section and parts being represented as broken away, of the molding devices and the mold in full lines, showing the normal position of the more immediately connected parts and the position of the same after initial movement in dotted lines. Fig. 6 is a view of the parts shown in Fig. 5, as they will appear after being moved to mold a counter or stiffener. Fig. 7 is a vertical central sectional view of the middle part of the machine, designed to show the main parts of the means for forming or setting the flange on the counter and the manner of operating the said means, the wiper or flange-forming side being shown as just on the point of being moved down. Fig. 8 is a sectional detail view showing the relative position of the parts immediately connected with the mold after the wiper has been moved down to set the flange. Fig. 9 is a horizontal sectional view of the machine taken on a line running through the mold. Fig. 10 is a top plan view of the machine.

In the drawings, $a$ designates the frame of the machine, which may be of any character or construction suited to support the operative part of the machine.

$b$ is the last or stationary mold supported from the bed $c$, $d$ the movable divided molds adapted to co-operate with the last $b$, connected through intermediate devices extending through the movable head $e$, connected with vertically-movable rods $f$.

$g$ is the main shaft, which is geared with the shaft $h$, upon which there is secured the cam $i$, operating in the fork of a lever $j$ and arranged to act upon a bowl or roller $k$ of the said lever, so as to actuate the toggle-levers $l$, connected with the head $e$ and lever $j$, and draw the said head down, the springs $m$ serving to raise the said head.

The description thus far given, except as to the molds and the manner of operating the same, may be of the form and arrangement shown, or any other organization suited to the purpose.

The molds $d$ are, as has already been indicated, of the divided type or kind and are adapted to be closed upon the material upon the mold $b$, and, as it were, iron the same down on the sides thereof and compress it thereon, so that the forward ends of the counter may incline each toward the other. In order to accomplish this and to secure a perfect fitting together of the molds along their line of contact as will leave no rib or mark at the back of the heel, regardless of slight variation in the thickness of the stock being operated upon, the improvements are employed which will first be described.

$m'$ designates compressing blocks or brackets provided with inclined tracks or ways $n$, upon which the sliding blocks $o$, pivoted at $p$ upon the sides of the molds $d$, are adapted to move.

$q$ designates strips secured to the sides of the compressing-blocks $m'$ to serve as guides to keep the sliding blocks in place on the ways $n$. The molds $d$ are also loosely connected with the lower end of the rod $r$ by means of a pivot-pin $s$, fitted in grooves formed on the inner sides of the molds above the center of the pair, as is clearly shown in Figs. 5 and 6, the said rod $r$, extending up through the head $e$, yoke $t$, (connected at its lower ends with the frame $a$ and extending over the head,) and blocks or pieces $u$ $v$.

$w$ designates a friction-bearing, of rubber or other suitable material, herein shown as of frusto-conical form, arranged in the block $u$, through which the rod $r$ passes. A spring $x$, surrounding the bar $r$, is interposed between the friction-bearing $w$ and the block $v$.

$y$ designates head-bolts passed through the block $v$ and at their lower ends tapped into the block $u$, and $z$ designates similar bolts passed upward through holes formed in the yoke $t$ and at their upper ends tapped into the block $u$.

$a'$ designates springs set at their upper ends within the recesses $u'$, formed in the block $u$ and bearing at their lower ends upon the yoke $t$. Set-screws $t'$, tapped into the block $u$ and at their inner ends bearing upon the upper ends of the springs $a'$, serve to regulate the tension or stress with which the said springs will resist the compression of the block $u$ upon the upper face of the yoke $t$.

With a machine organized as thus far described, the molding of a counter-blank may be accomplished and performed as follows: The head and mold $d$ and connected parts being in raised position, as shown in Fig. 1 and by full lines in Fig. 5, a blank or suitable piece of stock $c'$ (see Fig. 6) may be placed in position on the stationary last or mold $b$ and the head $e$ caused to descend. Upon the first downward movement of the head $e$, the compressing-blocks $m'$, acting upon the sliding blocks $o$, will move the molds $d$ upon the pivot-pin $s$ as a center or axis until their edges at the seam-point $d'$ are brought together, when said seam-point $d'$ will serve as the center or axis for the movement of the mold in further closing their lower ends upon the sides of the blank, as is shown by the dotted lines through Fig. 5. In the first part of the downward movement of the head $e$ the molds $d$ are prevented by rod $r$ from being moved downward, so that the compression-block $m'$ may act to close them on the sides of the blank on the mold $b$, the molds $d$ being pivotally hung on rod $r$, through the friction block or bearing $w$, which acts to resist or retard the downward movement of the said rod and their further descent prevented, except as hereinafter explained, and the further downward movement of the compression-blocks will serve to compress the molds $d$ laterally upon the blank on the last $b$ and mold the same into proper form, the rubber blocks or pieces $g'$ beneath the standards $f'$ yielding sufficiently to allow the molds to be compressed upon the material upon the top of the mold $b$. After the molds $d$ have been closed upon the sides of the material upon the last $b$ and said molds are moved downward, as before explained, the rod $r$ will be drawn downward and with it the block $u$ and friction-bearing $w$, compressing the springs $a'$, bringing the lower end of said bearing $w$ upon the yoke $t$ and to an extent moving it upward, so as to release to a certain extent the frictional resistance of the bearing $w$ to the downward movement of the rod $r$. The blank $c'$ having been molded, as before described, the next operation of the machine will be to set or form the flange from the portion of the material $c'$ extending forward from the front face of the last or mold $b$, and this is accomplished by the descent of what is termed the "wiper" $h'$, connected with the vertically-movable frame $i'$. To the cam-shaft $h$ there is affixed a crank (though it might as well be a disk) $j'$, the pin $h'$ in the end of which is adapted to engage the forked end $l'$ of a lever $m^2$, fulcrumed upon the end of a crank or lever $n'$, connected with a shaft $o'$, with which is in a like manner connected the inner end of a lever $p'$, the outer end of which is pivoted to the lower end of a pitman or link-bar $q'$, the upper end of which is pivotally connected with the wiper-frame $i'$. When the crank-pin $k'$ first engages the fork end of the lever $m^2$, the parts will be in the full-line position of Figs. 2 and 7, and in the rotation of the shaft $h$ the parts will be moved to the dotted-line position represented in the last-named figure, drawing the wiper-frame and wiper down, as indicated in Fig. 8, and setting the flanges on the molded counter. In the continued rotation of the shaft $h$ the crank-pin $k'$ will escape from the forked end $l'$ of the lever $m^2$ and engage the forked end $r'$ of the lever $s'$, pivoted to the lower end of the lever $t^2$, also connected with the shaft $o'$, and, in the further operation of the machine, move the levers $s'$ and $t^2$ and parts connected therewith from the dotted-line position, Fig. 7, to the full-line position of the parts, same figure, effecting through the resistance of springs, if need be, the raising of the wiper and wiper-frame $h'$ $i'$.

$i'$ designates the wiper-frame guided in suitable ways in the frame $a$, so as to secure the proper vertical movement.

$w'$ designates a projection of the frame extending rearwardly along the sides of an extension $x'$ of the stationary lasts or mold $b$.

$y'$ is a bracket connected with a head $e$, and to the rearward end or part of the said bracket there are pivotally connected the rearward ends of levers $z'$, the front ends of which levers are connected, through the medium of links $a''$, with the wiper-frame $i'$, so that when the wiper-frame descends the lever $z'$ will be drawn downward therewith.

$b''$ designates link-rods connected at their lower ends with the lever $z'$, and at their upper ends connected with a bar or yoke $c^2$, through which there extends the upper end of a rod $d''$, the lower end of which rod is pivotally connected with a wedge-shaped piece $e^2$, which wedge $e^2$ extends vertically between the rear end $x'$ of the stationary last $b$ and an adjacent part $f''$ of the wiper-frame. A spring $g^2$ is interposed between the bar or yoke $c^2$ and a collar $h''$ on rod $d''$, so that as the wiper-frame $i'$ is drawn downward the wedge $e^2$ will also be drawn down with a yielding pressure, and so by action against the part $f''$ of the wiper-frame draw the latter rearwardly, so that the latter will act with a yielding pressure against the material forming a flange of the counter on the face of the stationary mold.

It is to be observed that the stationary mold $b$ might be made to move horizontally and the upper frame be made rigid in a horizontal direction, so that the descent of the wedge would move the said mold $b$ forward instead of moving the wiper-frame rearwardly; but this would be but a mere reversal of the line of movement of the parts.

Various other changes in the form and arrangement of parts may be made without departing from the nature or spirit of my invention.

Having thus explained the nature of my invention and described a way of constructing and using the same, though without attempting to describe all of the alternate equivalent ways with which the same may be made, I declare that what I claim is—

1. A counter-molding machine comprising in its construction a stationary mold or last, movable divided molds, a movable support to which said movable molds are pivotally connected, a friction-bearing $w$ for the said support to retard or resist its movement, and a clamping or pressing device for pressing upon the sides of the movable molds, as set forth.

2. A counter-molding machine comprising in its construction a stationary mold or last, movable divided molds, a movable support to which said movable molds are pivotally connected, a friction-bearing $w$ for the said support to retard or resist its movement, blocks $o$, pivoted to the movable molds, and movable inclined presser-blocks $m'$ to act upon the blocks $o$, as set forth.

3. A counter-molding machine embracing in its construction a stationary mold or last, movable divided molds, a pivot-pin $s$ above the seam-point $d'$, upon which the movable molds are adapted to rock or oscillate, a movable support for the molds connected with the said pivot-pin, a friction-bearing for the said support to retard or resist its movement, and a clamping or pressing device for pressing upon the sides of the movable mold, whereby the molds may first be rocked upon the said pivot-pin and then upon their bodies at the seam-point $d'$, and compressed upon the material on the stationary last, as set forth.

4. In a counter-molding machine, the combination, with the stationary mold, of the movable molds, the pin $s$, upon which the molds are pivoted, the said pin being located above the seam-point, the sliding block $o$, pivoted upon the movable molds, springs interposed between the pivoted ends of the molds and the sliding blocks, and the compressing blocks or bed $m'$, as set forth.

5. In a counter-molding machine, the combination, with the stationary mold, of the movable molds, the pin $s$, upon which the molds are pivoted, the said pin being located above the seam-point, a movable support for the said molds connected with the said pin, a friction-bearing $w$ for the said support to resist or retard its movement, the sliding blocks $o$, pivoted upon the movable molds, springs interposed between the pivoted ends of the molds and the sliding blocks, and the compressing blocks or bed $m'$, as set forth.

6. A counter-molding machine embracing in its construction molding devices, a flange-setting slide, a rotary shaft $h$, a crank $j'$, provided on its end with a laterally-projecting pin, a rock-shaft $o'$, levers $n'$ $t^2$, connected with the said rock-shaft, levers $m^2$ $s'$, connected at one end to the levers $n'$ $t^2$ and provided at their other ends with notches adapted to be engaged by the pin of crank $j'$, lever $p'$, connected with the shaft $o'$, and link-bar $q'$, connecting the lever $p'$ with the flange-setting device, as set forth.

In testimony whereof I have signed my name to this specification, in the presence of two subscribing witnesses, this 30th day of December, A. D. 1890.

WILLIAM C. STEWART.

Witnesses:
ARTHUR W. CROSSLEY,
A. D. HARRISON.